United States Patent
Dufendach et al.

(10) Patent No.: US 11,014,442 B2
(45) Date of Patent: May 25, 2021

(54) FUEL TANK FILL PIPE ASSEMBLY

(71) Applicant: STANT USA CORP., Connersville, IN (US)

(72) Inventors: Dari Dufendach, Connersville, IN (US); Paul C. Wetzel, II, Oxford, OH (US); Michael S. Brock, Connersville, IN (US)

(73) Assignee: STANT USA CORP., Connersville, IN (US)

( * ) Notice: Subject to any disclaimer, the term of this patent is extended or adjusted under 35 U.S.C. 154(b) by 107 days.

(21) Appl. No.: 16/344,996

(22) PCT Filed: Feb. 28, 2018

(86) PCT No.: PCT/US2018/020232
§ 371 (c)(1),
(2) Date: Apr. 25, 2019

(87) PCT Pub. No.: WO2018/160698
PCT Pub. Date: Sep. 7, 2018

(65) Prior Publication Data
US 2020/0047608 A1    Feb. 13, 2020

Related U.S. Application Data

(60) Provisional application No. 62/465,345, filed on Mar. 1, 2017.

(51) Int. Cl.
*B60K 15/04*    (2006.01)
*B67D 7/54*    (2010.01)
*B60K 15/03*    (2006.01)

(52) U.S. Cl.
CPC .............. *B60K 15/04* (2013.01); *B67D 7/54* (2013.01); *B60K 2015/03447* (2013.01); *B60K 2015/047* (2013.01)

(58) Field of Classification Search
CPC .......... B60K 15/04; B60K 2015/03447; B60K 2015/047; B60K 2015/0474; B60K 15/03; B60K 15/01; B67D 7/54; B60Y 2410/123
See application file for complete search history.

(56) References Cited

U.S. PATENT DOCUMENTS 6,330,893 B1 * 12/2001 O'Connell ............. B60K 15/04
141/286
6,447,026 B2    9/2002 Palvoelgyi
(Continued)

FOREIGN PATENT DOCUMENTS

JP    08-254289 A    10/1996

OTHER PUBLICATIONS

PCT International Search Report and Written Opinion completed by the ISA/KR dated Jun. 8, 2018 and issued in connection with PCT/US2018/020232.

*Primary Examiner* — Jason K Niesz
(74) *Attorney, Agent, or Firm* — Barnes & Thornburg LLP (57) ABSTRACT

The present disclosure is directed to a fuel tank fill pipe assembly configured to conduct liquid fuel from a fuel-dispensing nozzle to a fuel tank. The fuel tank fill pipe assembly includes a filler head assembly shaped to receive the fuel-dispensing nozzle and a filler pipe that extends from the filler head assembly toward the fuel tank. In illustrated embodiments, a coupler is included for attaching the filler head assembly to the filler pipe while blocking fuel vapor from escaping the fuel tank fill pipe assembly so that hydrocarbons present in the fuel vapor are not released into the environment.

20 Claims, 5 Drawing Sheets

(56) References Cited

U.S. PATENT DOCUMENTS

| | | |
|---|---|---|
| 6,679,396 B1 | 1/2004 | Foltz et al. |
| 7,556,067 B2 | 7/2009 | McClung |
| 2006/0152003 A1 | 7/2006 | Slunick et al. |
| 2016/0121715 A1* | 5/2016 | Dufendach ............ B60K 15/04 220/86.2 |
| 2017/0001516 A1* | 1/2017 | Beck ...................... B60K 15/04 |
| 2017/0021723 A1* | 1/2017 | Visarius ................. B60K 15/01 |

* cited by examiner

FUEL TANK FILL PIPE ASSEMBLY

CROSS-REFERENCE TO RELATED APPLICATIONS

This application is a U.S. national counterpart application of international application Serial No. PCT/US2018/020232, filed Feb. 28, 2018, which claims priority to U.S. Provisional Application Ser. No. 62/465,345, filed Mar. 1, 2017. The disclosures of both PCT/US2018/020232 and U.S. Provisional Application Ser. No. 62/465,345 are incorporated by reference in their entireties.

BACKGROUND

The present disclosure relates to a fuel tank fill assembly. More particularly, the present disclosure relates to a fuel tank fill assembly for a vehicle fuel tank.

SUMMARY

A fuel tank fill pipe assembly according to the present disclosure is configured to conduct liquid fuel from a fuel-dispensing nozzle to a fuel tank. The fuel tank fill pipe assembly includes a filler head assembly shaped to receive the fuel-dispensing nozzle and a filler pipe that extends from the filler head assembly toward the fuel tank.

In illustrative embodiments, the fuel tank fill pipe assembly includes a low-permeation coupler arranged at the interface of the filler head assembly and the filler pipe. The low-permeation coupler provides joint means for mechanically connecting the filler head assembly to the filler pipe and for sealing along an outside diameter of the filler pipe at the interface of the filler pipe with the filler head assembly to block fuel vapor from escaping the fuel tank fill pipe assembly so that hydrocarbons present in the fuel vapor are not released into the environment.

In illustrative embodiments, the low-permeation coupler includes an overmolded shoulder chemically bonded to the filler pipe, a crimp ring attached to the filler head assembly, and at least one O-ring seal. The overmolded shoulder provides a controlled outwardly-facing sealing surface and the crimp ring provides an inwardly facing sealing surface between which the O-ring seal(s) can be positioned to seal the interface of the filler head assembly with the filler pipe.

In illustrative embodiments, the filler pipe may be an extruded tube of polymeric/plastics material construction. The filler pipe may be made up of a single layer or multiple layers of material that are co-extruded to define a fuel-conducting passageway. In some such embodiments, a fill cup included in the filler head assembly that interfaces with the filler pipe may comprise metallic materials such as steel or stainless steel.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 4 is an exploded perspective assembly view of the fuel tank fill pipe assembly of FIGS. 1-3 showing that the filler head assembly includes the fill cup, a capless closure unit, and a mount bracket; showing that the filler pipe is an extruded multi-directional tube adapted to carry liquid fuel from the filler head assembly to a remote fuel tank; showing that the low-permeation coupler includes the crimp ring configured to be bonded to the filler head assembly, the overmolded shoulder configured to be bonded to the filler pipe, and the O-ring seals for sealing between the crimp ring and an outside diameter of the overmolded shoulder; and further showing an overmolded barb configured to be bonded to an outlet end of the filler pipe to provide for sealing between the outlet end of the filler pipe and a filler hose that interconnects the filler pipe to a fuel tank;

DETAILED DESCRIPTION

Figure 1:
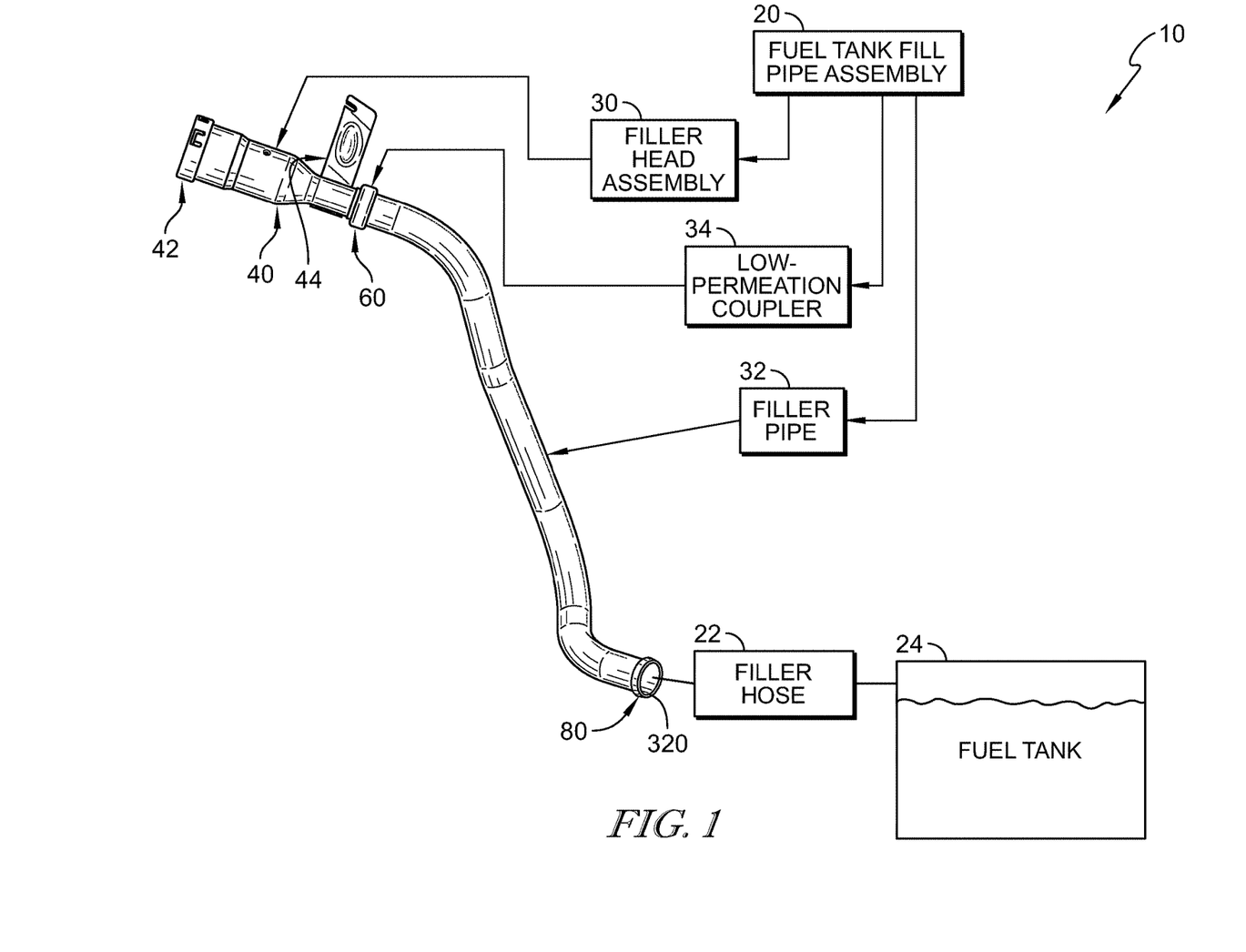
FIG. 1 is a perspective view of a fuel tank fill pipe assembly suggesting diagrammatically that the fuel tank fill pipe assembly is adapted to conduct fuel to a vehicle fuel tank from a fuel-dispensing nozzle and showing that the fuel tank fill pipe assembly includes a filler head assembly configured to receive a fuel nozzle, a filler pipe configured to carry fuel from the filler head assembly toward a fuel tank, and a low-permeation coupler assembly that provides a joint between the filler head assembly and the filler pipe.

A fuel storage system 10, as shown in FIG. 1, is adapted to receive and store liquid fuel for use in a vehicle. Fuel storage system 10 illustratively includes a fuel tank fill pipe assembly 20, a filler hose 22, and a fuel tank 24. Fuel tank fill pipe assembly 20 is configured to conduct fuel to fuel tank 24 from a fuel-dispensing nozzle (not shown). Filler hose 22 is illustratively flexible and interconnects the exemplary fuel tank fill pipe assembly 20 to fuel tank 24. Fuel tank 24 stores liquid fuel for later use by an engine included in a vehicle to propel the vehicle.

Fuel tank fill pipe assembly 20 provides an accessible insertion point 21 for a fuel-dispensing nozzle and extends toward fuel tank 24 spaced apart from insertion point 21 as shown in FIG. 1. Fuel tank pipe assembly 20 illustratively includes a fill head assembly 30, a filler pipe 32, and a low-permeation coupler 34. Filler head assembly 30 is configured to receive a fuel-dispensing nozzle inserted into fuel tank fill pipe assembly 20. Filler pipe 32 extends from filler head assembly 32 toward fuel tank 24 and defines a passageway 33 for carrying liquid fuel from filler head assembly 30 toward fuel tank 24. Low-permeation coupler 34 is arranged at the interface of filler head assembly 30 with filler pipe 32 and couples components of filler head assembly 30 with filler pipe 32.

Figures 2, 3:
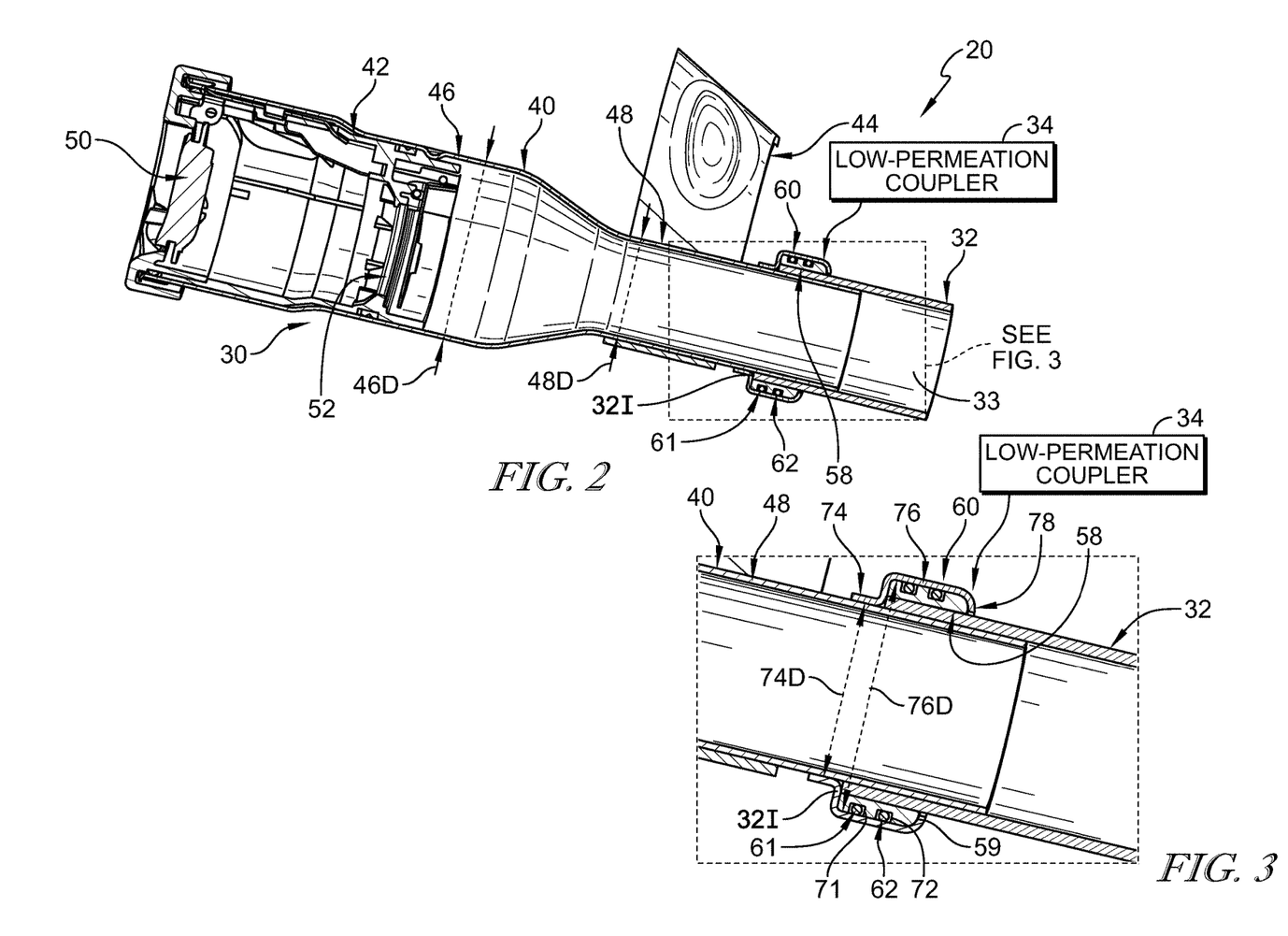
FIG. 2 is a cross-sectional view of a portion of the fuel tank fill pipe assembly included in FIG. 1 showing that a fill cup included in the filler head assembly comprises metallic materials while the filler pipe comprises polymeric materials and showing that the low-permeation coupler assembly couples the fill cup to the filler pipe.
FIG. 3 is a detail view of a portion of FIG. 2 showing that the low-permeation coupler includes a crimp ring coupled to the fill cup, an overmolded shoulder bonded to the filler pipe and received by the crimp ring, and O-ring seals that engage an interior surface of the crimp ring and an outer diameter of the overmolded shoulder.

Low-permeation coupler 34 provides a joint that mechanically attaches filler head assembly 30 to filler pipe 32 as shown in FIG. 3. Low-permeation coupler 34 also provides a joint that seals along an outside diameter of filler pipe 32 to block fuel vapor from escaping fuel tank fill pipe assembly 20 at the interface between filler head assembly 30 and filler pipe 32 so that hydrocarbons in the fuel vapor do not escape to the atmosphere around fuel tank fill pipe assembly 20.

Figure 4:
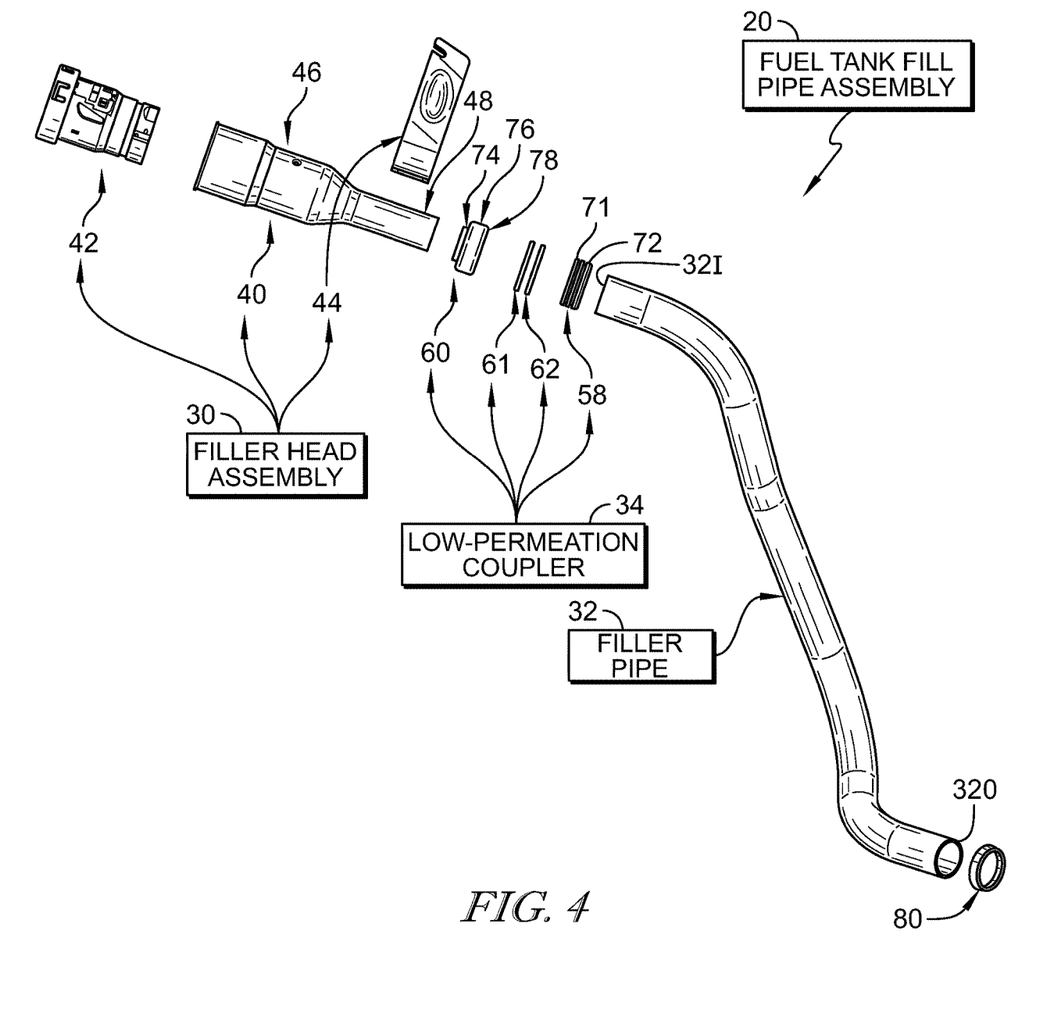
Figure 5:
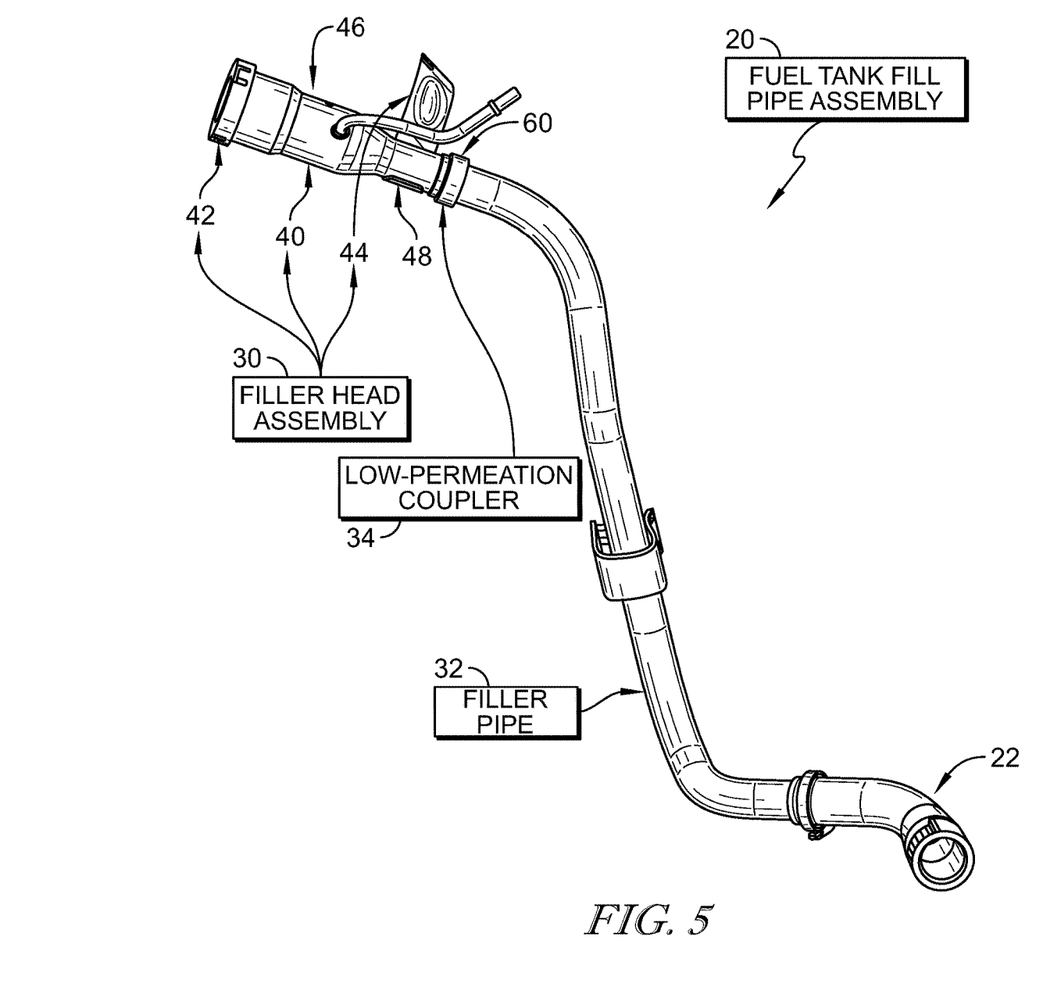
FIG. 5 is a perspective view of the fuel tank fill pipe assembly of FIGS. 1-4 showing the outlet end of the filler pipe and overmolded barb inserted into a filler hose and fixed in place via a hose clamp.
Figure 6:
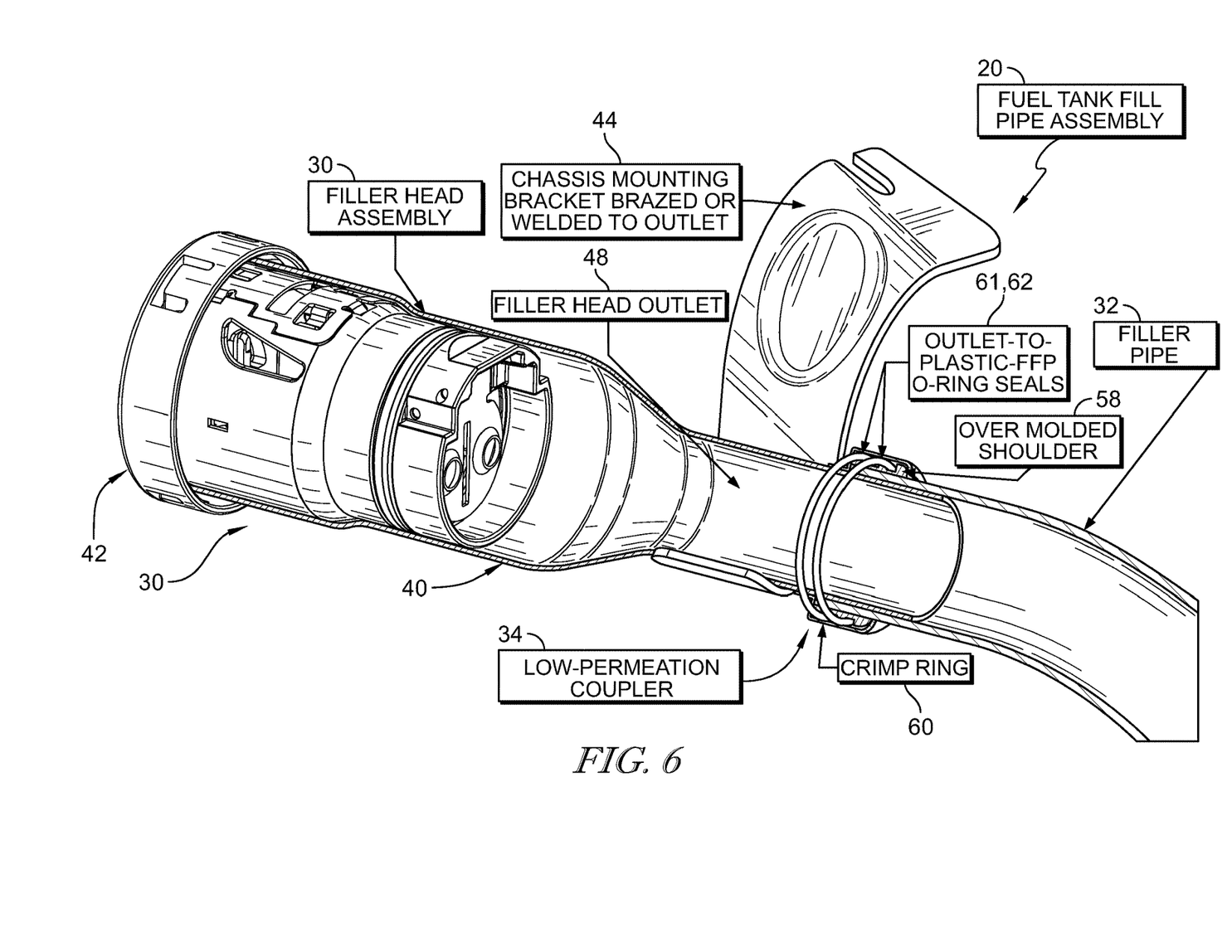
FIG. 6 is a perspective view of the filler head assembly coupled to the filler pipe by the low-permeation coupler with the fill cup of the filler head assembly and crimp ring cut away to show the overmolded shoulder and O-ring seals of the low-permeation coupler.

Filler head assembly 30 of the exemplary embodiment includes a fill cup 40, a closure unit 42, and a mount bracket 44 as shown in FIGS. 1, 2 and 4. Fill cup 40 comprises metallic materials and defines a nozzle-receiving space 45 adapted to receive a fuel-dispensing nozzle. Closure unit 42 is mounted in fill cup 40 and selectively closes nozzle-receiving space 45. Mount bracket 44 comprises metallic materials and is coupled to fill cup 40 to provide an attachment feature for holding the rest of fuel tank fill pipe assembly 20 in place relative to a vehicle.

Fill cup 40 is illustratively formed from steel or stainless steel suitable for receiving liquid fuel as suggested in FIGS. 2 and 4. Fill cup 40 includes an inlet portion 46 and an outlet portion 48. Inlet portion 46 has a diameter 46D sized to receive closure unit 42. Outlet portion 48 has a diameter 48D, smaller than diameter 46D of inlet portion 46, and mount bracket 44 is welded or brazed to outlet portion 48.

In the illustrative embodiment, closure unit 42 is a capless closure unit that includes an outer dust cover 50 and an inner closure door 52 that pivot to allow entry of a fuel-dispensing nozzle into nozzle-receiving space 45. In other embodiments, a screw-on cap style closure unit may be used in place of the illustrated capless closure unit.

Filler pipe 32 is illustratively a multi-directional extruded tube that comprises polymeric materials as suggested in FIGS. 1-3. Filler pipe 32 may be of mono- or multi-layer construction that is thermoformed to function as a fuel-conducting pipe. In illustrative examples, filler pipe 32 may be a single polyamide layer tube. In illustrative examples, filler pipe 32 may be a multi-layer tube with a polyamide outer layer (i.e. PA 6/12, etc.) and a low permeability inner layer (i.e. MX-Nylon, Polyketone, PA9T, etc.). In other embodiments, filler pipe 32 may be of other construction suitable for carrying liquid fuel.

Low-permeation coupler 34 provides means for connecting filler head assembly 30 to filler pipe 32 as shown in FIGS. 1-3. Low-permeation coupler 34 also provides means for sealing the interface between filler head assembly 30 and filler pipe 32 along an outside diameter of filler pipe 32 to block fuel vapor from escaping the fuel tank fill pipe assembly 20 so that hydrocarbons present in the fuel vapor are retained in fuel storage system 10.

Low-permeation coupler 34 illustratively includes an overmolded shoulder 58, a crimp ring 60, and O-ring seals 61, 62 as shown in FIGS. 3 and 4. Overmolded shoulder 58 is bonded to an outer diameter 32D of filler pipe 32. Crimp Ring 60 comprises metallic materials and is bonded to outlet portion 48 of fill cup 30. O-ring seals 61, 62 are arranged in seal grooves 71, 72 formed in overmolded shoulder 58 and engage crimp ring 60 to seal between overmolded shoulder 58 and crimp ring 60.

In the illustrative embodiment, overmolded shoulder 58 comprises polymeric materials similar to those of filler pipe 32 as suggested in FIG. 3. Overmolded shoulder 58 is chemically bonded to filler pipe 32 and extends along a length of filler pipe 32 at an inlet end 32I of filler pipe 32 to create a sealed interface between overmolded shoulder 58 and filler pipe 32.

Crimp ring 60 is illustratively formed from steel or stainless steel as suggested in FIG. 3. Crimp ring 60 includes an attachment portion 74, a sealing portion 76, and a crimped portion 78. Attachment portion 74 sized to receive outlet portion 48 of fill cup 40 and is brazed to outlet portion 48 of fill cup 40 to form a hermetic seal therebetween. Sealing portion 76 extends from attachment portion and has a diameter 76D larger than a diameter 74D of the attachment portion 74. When assembled, an annular space is formed between the outlet portion of fill cup 40 and sealing portion 76 that receives inlet end 32I of filler pipe 32 and overmolded shoulder 58. Crimp portion 78 extends from sealing portion 76 inward toward filler pipe 32 along an end face 59 of overmolded shoulder 58 so that crimp ring 60 and filler head assembly 30 are blocked being removed from filler pipe 32.

O-ring seals 61, 62 are arranged in seal grooves 71, 72 formed in overmolded shoulder 58 and engage sealing portion 76 of crimp ring 60 as shown in FIG. 3. O-ring seal 61 is arranged nearest to inlet end 32I of filler pipe 32 and is illustratively a flourosilicone-rubber O-ring. O-ring seal 62 is arranged further from inlet end 32I of filler pipe 32 than O-ring seal 61 and is illustratively a fluorocarbon-rubber O-ring.

Fuel tank fill pipe assembly 20 of the present disclosure also includes an overmolded barb 80 as shown in FIGS. 1 and 4. Overmolded barb 80 provides an overmold feature bonded to an outlet end 32O of the filler pipe 32 to provide for sealing between the outlet end 32O of the filler pipe 32 and filler hose 22 that interconnects the filler pipe 32 to fuel tank 24. In other embodiments, overmolded barb 80 or other overmolded features bonded to filler pipe 32 at the outlet end 32O may sealingly engage directly with a check valve or a fuel tank.

According to the present disclosure, plastic FFP (fuel filler pipe), like filler pipe 32, may be implemented with a robust and low-perm interface between the extruded plastic tube of the filler pipe 32 and mating filler head assembly (a.k.a. "funnel") 30. The filler head assembly 30 can incorporate either a conventional fuel cap or a capless closure unit (sometimes called a cartridge).

The present disclosure is directed to, among other things, the mechanical joint connecting a metal filler head to an extruded plastic tube (mono or multi-layer) thermoformed to function as a FFP. In some designs, plastic tubes used to convey fuel in a liquid and or vapor state have been forced onto a barbed fitting via a process called swedging. The interference fit between the tube and fitting causes the tube to expand and fit tightly around fitting barbs that seal and mechanically retain the tube. When further sealing is needed, optional O-rings may be installed to seal against the expanded tube's inside diameter.

Swedge-type fittings may be used in various applications such as fuel line supply and return lines between a vehicle's fuel pump and engine or a larger-diameter line carrying fuel vapor and or air. As tube diameter increases fittings can become less common or require custom designs. The resulting joint can be a source of hydrocarbon permeation, even when low-permeation polymers are used to extrude the tube and mold the fitting. In such designs, permeation at joints can be because sealing must occur on the tube inside diameter with fitting barbs optionally with one or two O-rings.

Designs in accordance with the present disclosure can provide low permeation at a joint by sealing to a tube's outside diameter, rather than an inside diameter, by overmolding a feature on the tube end that chemically bonds to the tube outside diameter. One illustrated overmolded feature 58 has a provision for two O-rings 61, 62 that seal against the inside diameter of a steel or stainless steel crimp ring 60, which itself is impermeable to hydrocarbon molecules.

Designs in accordance with the present disclosure may comprise interface features at the steel or stainless steel filler head outlet 48 and the plastic FFP inlet 32I. The filler head assembly 30 can mate with a steel or stainless steel crimp ring 60 formed of thinner gage sheet stock to a modified-tube shape. The crimp ring 60 can have a stepped feature that reduces its tube inside diameter at one end to a slip fit over the filler head outlet 48 outside diameter. The crimp ring 60 may be attached via a brazing or welding process that can forms a hermetic seal between the crimp ring 60 and filler head outlet 48. The crimp ring 60 may be attached concentric to the filler pipe outlet to create a uniform annular air space. The crimp ring 60 and filler pipe outlet 48 surrounding this air space provide one mating feature for the inlet 32I of the plastic FFP 32.

The plastic filler pipe's inlet 32I may have a tube-shaped ring or shoulder 58 overmolded to the filler pipe 32 outside diameter with the same resin type used to, extrude the filler pipe's outer layer. The overmolded ring 58 may have two outer diameter grooves 71, 72 for O-rings. The first groove 71 (closest to the pipe's inlet opening) illustratively receives a fluorosilicone-rubber O-ring 61 and the second 72 receives a fluorocarbon-rubber O-ring 62. The plastic filler pipe inlet 32I, with its overmolded ring 58 and O-rings 61, 62, is inserted into the annular air space created by the filler head crimp ring 60. After the filler pipe 32 has fully seated in the crimp ring 60, the open end of the ring 60 is crimped or folded behind the filler pipe's overmolded ring 58 to capture and lock it into the assembled position.

The following numbered clauses include embodiments that are contemplated and non-limiting:

Clause 1. A fuel tank fill pipe assembly adapted to conduct liquid fuel from a fuel-dispensing nozzle to a fuel tank, the assembly comprising a filler head assembly shaped to receive the fuel-dispensing nozzle, a filler pipe that defines a passageway for carrying liquid fuel from filler head assembly toward the fuel tank, and joint means for mechanically connecting the filler head assembly to the filler pipe and for sealing along an outside diameter of the filler pipe at the interface of the filler pipe with the filler head assembly to block fuel vapor from escaping the fuel tank fill pipe assembly so that hydrocarbons present in the fuel vapor are not released into the environment.

Clause 2. The assembly of any other suitable clause, wherein the joint means is provided by a low-permeation coupler that includes an overmolded shoulder chemically bonded to an outer surface of the filler pipe to provide a controlled outwardly-facing sealing surface, a crimp ring attached to the filler head assembly that provides an inwardly facing sealing surface arranged in confronting relation with the outwardly-facing sealing surface of the overmolded shoulder, and a first O-ring seal engaged with the overmolded shoulder and the crimp ring.

Clause 3. The assembly of any other suitable clause, wherein the overmolded shoulder is formed to include a first seal groove sized to receive a portion of the first O-ring seal so that the first O-ring seal is located at a predetermined location along the overmolded shoulder.

Clause 4. The assembly of any other suitable clause, wherein the crimp ring includes an attachment portion, a sealing portion, and a crimped portion, and further wherein the attachment portion is sized to receive a portion the filler head assembly, and/or the sealing portion extends from the attachment portion and has a diameter larger than a diameter of the attachment portion, and/or the crimp portion extends from the sealing portion inward toward the filler pipe along an end face of the overmolded shoulder so that the crimp ring and the filler head assembly are blocked being removed from the filler pipe.

Clause 5. The assembly of any other suitable clause, wherein the attachment portion of the crimp ring is bonded to the filler head assembly to form a hermetic seal therebetween.

Clause 6. The assembly of any other suitable clause, wherein an annular space is formed between the sealing portion of the crimp ring and the filler head assembly in which the overmolded shoulder of the joint means is received.

Clause 7. The assembly of any other suitable clause, wherein the filler pipe is an extruded tube of polymeric/plastics material extruded to define a fuel-conducting passageway, and/or the filler head assembly includes a fill cup comprising metallic materials, and/or the crimp ring is bonded to the fill cup to create a hermetic seal therebetween.

Clause 8. The assembly of any other suitable clause, wherein the filler pipe includes multiple layers of co-extruded material.

Clause 9. The assembly of any other suitable clause, wherein the filler pipe includes a first polyamide layer and a second layer interior to the first polyamide layer that has a lower permeability than the first polyamide later.

Clause 10. The assembly of any other suitable clause, wherein the low-permeation coupler further includes a second O-ring seal engaged with the overmolded shoulder and the crimp ring, and further wherein the first O-ring seal is arranged nearest to an inlet end of the filler pipe and comprises flourosilicone-rubber, and/or the second O-ring seal is arranged further from the inlet end of the filler pipe than the first O-ring seal and comprises a fluorocarbon-rubber.

The invention claimed is:

1. A fuel tank fill pipe assembly adapted to conduct liquid fuel from a fuel-dispensing nozzle to a fuel tank, the assembly comprising a filler head assembly shaped to receive the fuel-dispensing nozzle, a filler pipe that defines a passageway for carrying liquid fuel from filler head assembly toward the fuel tank, the passageway of the filler pipe receiving a portion of the filler head assembly, and joint means for mechanically connecting the filler head assembly to the filler pipe and for sealing along an outside diameter of the filler pipe at the interface of the filler pipe with the filler head assembly to block fuel vapor from escaping the fuel tank fill pipe assembly so that hydrocarbons present in the fuel vapor are not released into the environment, wherein the joint means is provided by a low-permeation coupler that includes an overmolded shoulder chemically bonded to an outer surface of the filler pipe located outward of the portion of the filler head assembly received in the passageway of the filler pipe to provide a controlled outwardly-facing sealing surface, a crimp ring attached to the filler head assembly that provides an inwardly facing sealing surface arranged in confronting relation with the outwardly-facing sealing surface of the overmolded shoulder, and a first O-ring seal engaged with the overmolded shoulder and the crimp ring.

2. The assembly of claim 1, wherein the overmolded shoulder is formed to include a first seal groove sized to receive a portion of the first O-ring seal so that the first O-ring seal is located at a predetermined location along the overmolded shoulder.

3. The assembly of claim 1, wherein the low-permeation coupler further includes a second O-ring seal engaged with the overmolded shoulder and the crimp ring, the first O-ring seal is arranged nearest to an inlet end of the filler pipe and comprises fluorosilicone-rubber, and the second O-ring seal is arranged further from the inlet end of the filler pipe than the first O-ring seal and comprises a fluorocarbon-rubber.

4. The assembly of claim 1, wherein the crimp ring includes an attachment portion, a sealing portion, and a crimped portion, the attachment portion is sized to receive a portion the filler head assembly, the sealing portion extends from the attachment portion and has a diameter larger than a diameter of the attachment portion, and the crimp portion extends from the sealing portion inward toward the filler pipe along an end face of the overmolded shoulder so that the crimp ring and the filler head assembly are blocked being removed from the filler pipe.

5. The assembly of claim 4, wherein the attachment portion of the crimp ring is bonded to the filler head assembly to form a hermetic seal therebetween.

6. The assembly of claim 4, wherein an annular space is formed between the sealing portion of the crimp ring and the filler head assembly in which the overmolded shoulder of the joint means is received.

7. The assembly of claim 1, wherein the filler pipe is an extruded tube of polymeric/plastics material extruded to define a fuel-conducting passageway, the filler head assembly includes a fill cup comprising metallic materials, and the crimp ring is bonded to the fill cup to create a hermetic seal therebetween.

8. The assembly of claim 7, wherein the filler pipe includes multiple layers of co-extruded material.

9. The assembly of claim 8, wherein the filler pipe includes a first polyamide layer and a second layer interior to the first polyamide layer that has a lower permeability than the first polyamide layer.

10. A fuel tank fill pipe assembly adapted to conduct liquid fuel from a fuel-dispensing nozzle to a fuel tank, the assembly comprising
a filler head assembly shaped to receive the fuel-dispensing nozzle,
a filler pipe that defines a passageway for carrying liquid fuel from filler head assembly to the fuel tank, the passageway of the filler pipe receiving a portion of the filler head assembly, and
a coupler that includes an overmolded shoulder chemically bonded to an outer surface of the filler pipe to provide a controlled outwardly-facing sealing surface, a crimp ring attached to the filler head assembly that provides an inwardly facing sealing surface arranged in confronting relation with the outwardly-facing sealing surface of the overmolded shoulder, and a first O-ring seal engaged with the overmolded shoulder and the crimp ring.

11. The assembly of claim 10, wherein the low-permeation coupler further includes a second O-ring seal engaged with the overmolded shoulder and the crimp ring, the first O-ring seal is arranged nearest to an inlet end of the filler pipe and comprises flourosilicone-rubber, and the second O-ring seal is arranged further from the inlet end of the filler pipe than the first O-ring seal and comprises a fluorocarbon-rubber.

12. The assembly of claim 10, wherein the filler pipe is an extruded tube of polymeric/plastics material extruded to define a fuel-conducting passageway, the filler head assembly includes a fill cup comprising metallic materials, and the crimp ring is bonded to the fill cup to create a hermetic seal therebetween.

13. The assembly of claim 12, wherein the filler pipe includes multiple layers of co-extruded material, and wherein the filler pipe includes a first polyamide layer and a second layer interior to the first polyamide layer that has a lower permeability than the first polyamide later.

14. The assembly of claim 10, wherein the overmolded shoulder is located outward of the portion of the filler head assembly received in the passageway of the filler pipe.

15. The assembly of claim 14, wherein the overmolded shoulder is formed to include a first seal groove sized to receive a portion of the first O-ring seal so that the first O-ring seal is located at a predetermined location along the overmolded shoulder.

16. The assembly of claim 14, wherein the crimp ring includes an attachment portion, a sealing portion, and a crimped portion, the attachment portion is sized to receive a portion the filler head assembly, the sealing portion extends from the attachment portion and has a diameter larger than a diameter of the attachment portion, and the crimp portion extends from the sealing portion inward toward the filler pipe along an end face of the overmolded shoulder so that the crimp ring and the filler head assembly are blocked being removed from the filler pipe.

17. The assembly of claim 16, wherein the attachment portion of the crimp ring is bonded to the filler head assembly to form a hermetic seal therebetween.

18. The assembly of claim 16, wherein an annular space is formed between the sealing portion of the crimp ring and the filler head assembly in which the overmolded shoulder of the joint means is received.

19. A method of making a fuel tank fill pipe assembly, the method comprising
inserting a portion of a filler head assembly shaped to receive a fuel dispensing nozzle into a passageway defined by a filler pipe that is sized to conduct liquid fuel from the filler head assembly to a fuel tank,
installing a crimp ring around an overmolded shoulder bonded to an outer surface of the filler pipe and around an O-ring engaged with the overmolded shoulder, and
crimping the crimp ring so that the crimp ring is retained in place around the overmolded shoulder while engaging the O-ring to establish a seal between the overmolded shoulder and the O-ring.

20. The method of claim 19, wherein installing the crimp ring includes bending a sleeve to form an attachment portion, a sealing portion, and a crimped portion, wherein the attachment portion is sized to receive a portion the filler head assembly, the sealing portion extends from the attachment portion and has a diameter larger than a diameter of the attachment portion, and the crimp portion extends from the sealing portion inward toward the filler pipe along an end face of the overmolded shoulder so that the crimp ring and the filler head assembly are blocked being removed from the filler pipe.

* * * * *